United States Patent
Retat et al.

(10) Patent No.: US 7,396,182 B2
(45) Date of Patent: Jul. 8, 2008

(54) NON-EXPLOSIVE DEVICE FOR RELEASABLY SECURING COMPONENTS

(75) Inventors: Ingo Retat, Achim (DE); Barbara Klotz, Stuhr (DE); Jens Wendorff, Grasberg (DE); Oliver Hoeni, Stuttgart (DE)

(73) Assignee: EADS Space Transportation GmbH, Bremen (DE)

( * ) Notice: Subject to any disclaimer, the term of this patent is extended or adjusted under 35 U.S.C. 154(b) by 185 days.

(21) Appl. No.: 11/174,436

(22) Filed: Jul. 1, 2005

(65) Prior Publication Data
US 2006/0088366 A1    Apr. 27, 2006

(30) Foreign Application Priority Data
Jul. 1, 2004    (DE) ............ 10 2004 031 861

(51) Int. Cl.
*H01H 71/20*    (2006.01)
(52) U.S. Cl. .............. 403/2; 403/11; 403/16; 403/28; 337/150; 337/153; 337/154; 337/411
(58) Field of Classification Search ............ 403/2, 403/11, 16, 21, 28; 337/142, 150, 153, 154, 337/401, 411; 464/31
See application file for complete search history.

(56) References Cited

U.S. PATENT DOCUMENTS

| | | | |
|---|---|---|---|
| 2,920,570 A | | 1/1960 | Martin et al. |
| 3,695,116 A | * | 10/1972 | Baur ............................ 74/2 |
| 3,863,720 A | * | 2/1975 | Young ...................... 169/59 |
| 4,430,552 A | | 2/1984 | Peterson |
| 5,046,426 A | | 9/1991 | Julien et al. |
| 5,606,889 A | * | 3/1997 | Bielinski et al. ............. 403/2 |
| 5,621,373 A | * | 4/1997 | McCormick ................. 403/2 |
| 5,748,066 A | * | 5/1998 | Holt ............................ 403/2 |
| 6,133,818 A | * | 10/2000 | Hsieh et al. ................. 337/401 |
| 6,404,322 B1 | | 6/2002 | Ruegsegger et al. |
| 6,439,122 B1 | | 8/2002 | Nygren et al. |
| 6,515,570 B2 | * | 2/2003 | Kaltenborn et al. ......... 337/142 |
| 2002/0080547 A1 | | 6/2002 | Rudoy et al. |

FOREIGN PATENT DOCUMENTS

| | | |
|---|---|---|
| EP | 0 121 959 | 10/1984 |
| EP | 0 716 982 | 6/1996 |
| EP | 1 426 291 | 6/2004 |
| GB | 1011680 | 12/1965 |

* cited by examiner

*Primary Examiner*—Daniel P. Stodola
*Assistant Examiner*—Michael P. Ferguson
(74) *Attorney, Agent, or Firm*—W F. Fasse; W. G. Fasse

(57) ABSTRACT

An arrangement for releasably securing or connecting together at least two components includes a securing element that interconnects the components and that can be melted, thermally decomposed or otherwise separated by applying heat thereto. The securing element is preferably a monofilament or multifilament thread of natural or synthetic material, such as high strength polymer material. The arrangement further preferably includes a compression bracing structure such as a housing that bears compression forces between the components, while the securing element bears tension forces. The arrangement further preferably includes an electric resistance heating element that can be electrically energized and is arranged to apply heat to the thread, so as to melt or decompose and separate the thread and thereby release and separate the two interconnected components.

21 Claims, 2 Drawing Sheets

NON-EXPLOSIVE DEVICE FOR RELEASABLY SECURING COMPONENTS

PRIORITY CLAIM

This application is based on and claims the priority under 35 U.S.C. §119 of German Patent Application 10 2004 031 861.1, filed on Jul. 1, 2004, the entire disclosure of which is incorporated herein by reference.

FIELD OF THE INVENTION

The invention relates to an apparatus or device for releasably securing components using a securing element that connects the components and that can be selectively released.

BACKGROUND INFORMATION

In various applications in space travel and technology, it is commonly known to provide devices that initially securely connect structural elements or components with each other, and that release and separate the components from each other at a later time, for example after a spacecraft has reached a prescribed position in space. Such a device is designed and constructed to provide a secure and strong interconnection until the device is later triggered or actuated to release the interconnection, whereupon a single permanent release or separation is carried out. Namely, such a device is not intended or designed to be able to re-connect or re-establish the connection at a later time. Rather, the release involves a one-time permanent separation or disconnection. Typical examples of such applications involve the deployment and unfolding of solar generators from satellites or the like in orbit, and the separation of spent rocket stages.

For such applications requiring a one-time permanent release of an interconnection, motorized drives are typically not used, because the constructive effort and expense that would be necessary to achieve a sufficient high reliability would be too great in consideration of the mere one-time separation that is required. Instead, such one-time separable connections are typically achieved by mounting, holding or securing devices that are separated or released through an explosive force generated by one or more explosive charges. Typical examples in this regard are explosive nuts, explosive bolts, explosively actuated bolt cutters, and explosively released clamping bands. Such devices or arrangements offer several advantages, such as a small structural size, typically a reliable functional operation, a simple and economical construction, a simple activation to achieve the release, and also the ability to be easily incorporated into existing structures and systems.

On the other hand, such known releasable securing devices that are released by explosive charges also suffer various disadvantages. For example, upon the ignition of the explosive charges for separating or releasing such devices, shock loads can arise, which might damage or destroy sensitive structures, components or devices connected to or mounted in the vicinity of the releasable securing device. Also, the handling of the explosive components requires special safety measures and can be safety critical. Similarly, in some cases the explosive release of the device may expel fragments of the securing element or other particles that become safety critical. For these reasons, the handling, installation and use of the known explosively releasable securing devices requires special care to be taken. Furthermore, the generation of combustion gases and the possible release of fragments when the device is explosively triggered, generally prevent an installation and use of such devices within the occupied interior of a manned spacecraft.

SUMMARY OF THE INVENTION

In view of the above, it is an object of the present invention to provide an apparatus or device of the abovementioned general type which has been further developed and improved to achieve a reliable and safe separation of components that are initially connected with one another by the device. A further particular object of the invention is to provide such a device for releasably securing components, whereby the device can be easily triggered to achieve the separation or release of the components without using an explosive blast. Another object is to avoid the release of fragments, particles and gases when such a device is triggered to release the connection. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a device or arrangement for releasably securing a first component and a second component with each other, comprising at least one securing element that connects the components to each other, wherein the securing element is meltable, thermally decomposable, or otherwise rupturable and thereby separable through the application of heat. Preferably, the securing element is a thread that can be melted, dissolved, or thermally degraded or decomposed and thereby separated through the application and influence of heat on the thread material. Thereby, the existing structural connection provided by the securing element (e.g. the thread) is separated in a one-time permanent manner. Thereby, the overall securing device or arrangement can be small and compact, simple in construction and actuation, and secure and safe in its handling, installation and use. The parts of the device or arrangement, including the securing element such as a thread, simply need to be configured and dimensioned appropriately for the particular application, e.g. to surely achieve the required securing strength.

The term "thread" herein is broadly defined to cover any elongated securing element that can be disrupted and separated through the application of heat. The thread may be a multifilament or multifiber thread, or alternatively may be a monofilament thread or single fiber or strand. The thread may be a thread, fiber, filament, cord, string, yarn, twine, rope, line, cable, wire, ribbon, tape, or the like. The thread has an elongated configuration, namely a length that is a multiple of the width or thickness thereof, for example preferably a length that is at least five times or even at least ten times or even at least fifty (or more) times the width or thickness thereof. The configuration of the securing element may involve a closed loop of the thread, with two strands or lengths or legs of the thread extending between the two components being interconnected thereby, or a single linear strand or length or leg of the thread extending between the two components.

The material for the fiber or fibers making up the thread of the securing element can be a synthetically produced material or a naturally arising material. The material may comprise a metal, or any known textile fiber, and preferably comprises an organic polymer fiber material. In especially preferred embodiments of the invention, high strength synthetic polymer fibers are used for the thread of the securing element, for example high modulus polyethylene fibers (e.g. commercially available under the trademark "SPECTRA"™), or fibers of aromatic polyamides or aramids and especially a polyparapheneneterephthalamide (e.g. commercially available under the Trademark "KEVLAR"™). With such high strength fibers, the releasable securing device can have a compact size yet a sufficient high securing strength to be suitable for carrying high loads. In any event, the material, the structural form, and the dimensions of the securing element are selected accordingly for the particular application, namely in view of the operating loads to be carried, the required tensile breaking strength, and the optimal temperature range (e.g. considering the operating temperature range as well as the desired triggering temperature for thermally disrupting and thereby releasing the securing element).

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
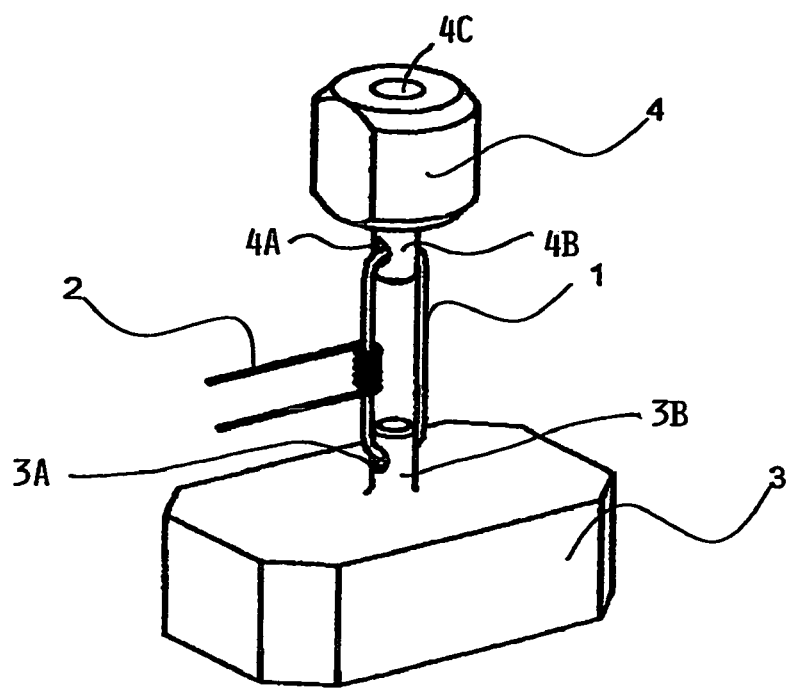
FIG. 1 is a perspective view of a first embodiment of a securing arrangement according to the invention in a secured or closed state.
Figure 2:
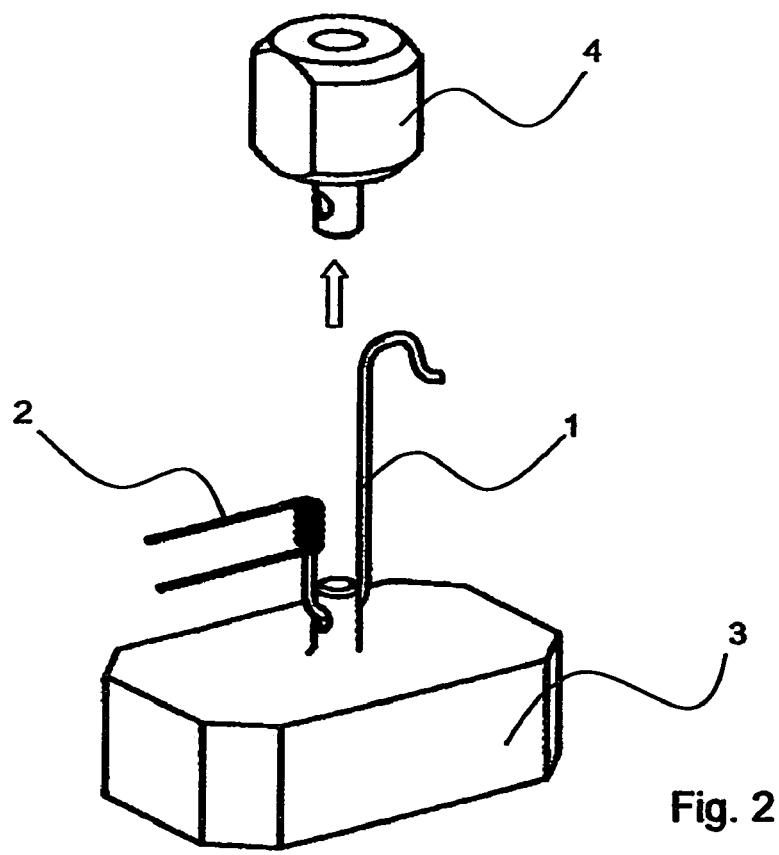
FIG. 2 is a perspective view of the securing arrangement of FIG. 1, but in a released or opened state.
Figure 3:
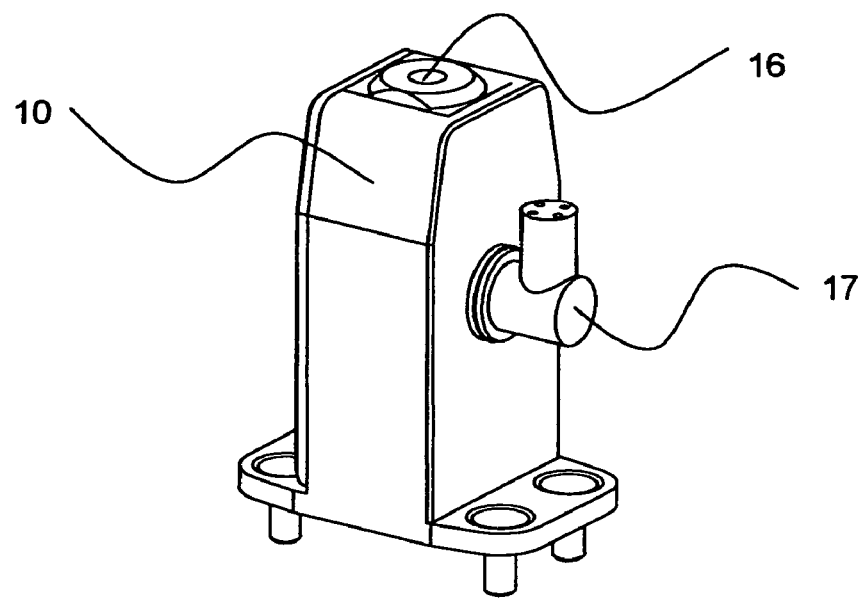
FIG. 3 is a perspective view of a second embodiment of a securing arrangement according to the invention arranged in a housing.
Figure 4:
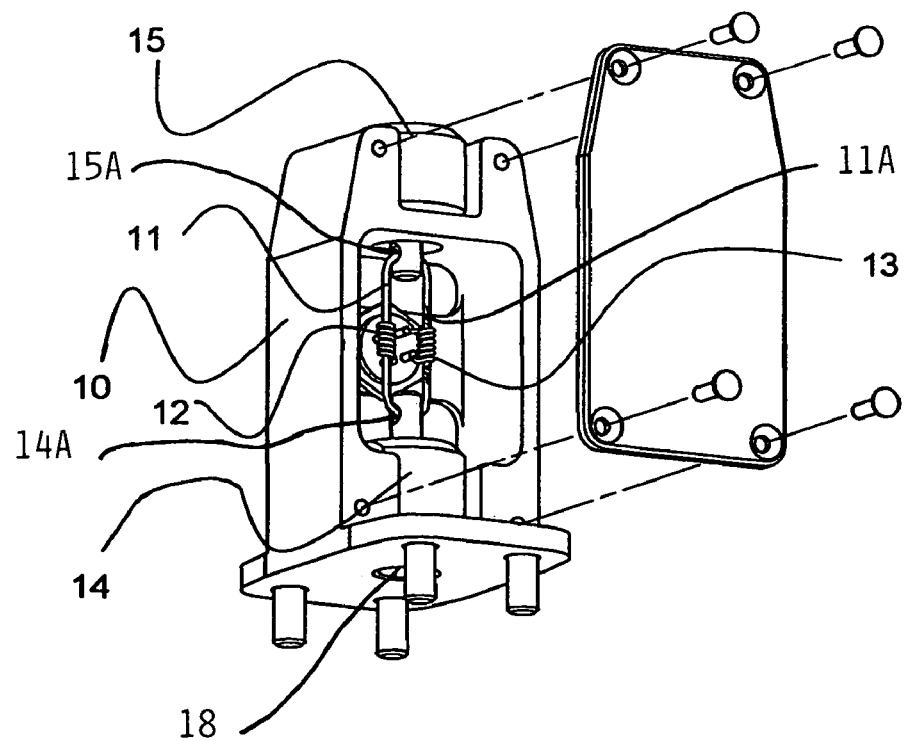
FIG. 4 is a perspective view of an opposite side of the housing of the arrangement of FIG. 3, with a cover of the housing removed to show the internal arrangement thereof.

The basic construction and functional principal of operation of a securing arrangement according to the invention are generally illustrated in FIGS. 1 and 2. On the other hand, FIGS. 3 and 4 show a practical application or embodiment of the inventive securing arrangement.

As shown in FIG. 1, a general embodiment of the inventive securing arrangement or device comprises a securing element 1, especially and preferably embodied as a securing thread 1, which carries and transmits loads in the form of tensile stresses through the thread 1 between a first structure or component 3 and a second structure or component 4 that are connected with each other by the thread 1. For example, the first component 3 may be a mounting base or bracket having a mounting stud 3B with a hook or eyelet 3A. The second component 4 may be a securing block or pin including a securing stud 4B with a hook or eyelet 4A.

The securing element 1 comprises a securing thread having a closed loop configuration, with two lengths, legs or strands of the thread 1 extending between the first component 3 and the second component 4. Particularly, the closed loop of the thread 1 extends through the eyelet 3A of the first component 3 and through the eyelet 4A of the second component 4. The closed loop of the thread 1 may be a continuous unending loop that was fabricated as such, whereby the first and second components 3 and 4 would have to have hooks (rather than the eyelets 3A and 4A) to receive the continuous closed loop. Alternatively, the closed loop of the thread 1 can be formed from a discontinuous linear piece of thread of which the ends are guided through the eyelets 3A and 4A and then knotted together to form the closed loop. Preferably the knot may be glued and secured, for example in the eyelet 3A of the first component 3.

The device or arrangement according to the invention further comprises a heating arrangement 2 arranged to apply heat energy to the thread 1. In this embodiment, the heating arrangement 2 comprises an electrical resistance heating element 2 having a spiral heating coil arranged around one leg, length or strand of the looped thread 1. In other words, one leg or strand of the loop of the thread 1 passes through the spiral resistance heating coil of the heating arrangement 2.

In the installed arrangement according to FIG. 1, the securing element 1 securely connects the second component 4 to the first component 3. The second component 4 such as a mounting block may further have a threaded mounting hole 4C therein, to which any desired component or structure can be secured by a bolt. Thus, up to the maximum permissible operating loads determined by the tensile strength of the thread 1, the thread (forming the securing element 1) secures and holds the components together.

When it is desired to release the connected condition shown in FIG. 1, it is simply necessary to apply a suitable electrical current to the heating arrangement 2 from an electrical power source (not shown). The electrical current resistively heats the spiral heating coil of the heating arrangement 2, and this heat is applied to the thread forming the securing element 1. Thereby, the thread is heated to a sufficient degree to be melted, dissolved, or thermally degraded or decomposed to the point that it ruptures, separates, or breaks by itself, or because it is no longer able to withstand the tensile forces applied between the two components 3 and 4. Thereby, the securing element 1 is separated and the two components 3 and 4 are released from each other as shown in FIG. 2. Especially if the thread 1 has been fixed by glue in the eyelet 3A of the first component 3 as mentioned above, the broken or separated thread stays fixed to the first component 3, and no pieces or fragments thereof are released. In fact, the inventive apparatus can be released or separated without emitting any fragments, contaminant particles, waste products, or even gases (especially if the thread material melts readily without thermal evolution of gas byproducts).

The exemplary practical application or embodiment of an inventive arrangement as shown in FIGS. 3 and 4 is based on the general inventive construction described above in connection with FIGS. 1 and 2. Basically, in FIGS. 3 and 4, the inventive arrangement has been supplemented with two heating arrangements rather than just one, and a housing structure that braces and holds the two components apart from each other while the securing element holds them together.

More particularly, in the practical application or embodiment shown in FIGS. 3 and 4, the securing apparatus or device is arranged in a housing 10 that can be secured by bolts to a structure or component that is not shown in the drawings. An electrical power supply for triggering the release of the securing device can also be mounted on or incorporated in the structure or component that is not shown. A first slide block 14 is connected to the housing 10 by a mounting and adjusting bolt 18. On the other hand, the second structure or component (not shown) that is to be selectively released or separated from the first component is connected by a bolt to a threaded bore or mounting hole 16 provided in a second slide block or pin 15.

A thread 11 of a high strength material forms a securing element 11 that connects the two slide blocks or pins 14 and 15 together. Similarly as described above in connection with FIGS. 1 and 2, in the assembly or installation of the arrangement of FIGS. 3 and 4, the thread 11 is pulled through eyelets 14A and 15A of the blocks or pins 14 and 15, and then the ends of the thread 11 are knotted together to form a closed loop. Preferably, the knot of the thread loop is then adhesively secured with a glue or adhesive in the eyelet 14A of the slide block 14 which remains fixed in the housing 10 by the mounting and adjusting bolt 18. The desired or required installed pre-tension of the loop of the thread 11 can be introduced and adjusted by appropriately adjusting the mounting and adjusting bolt 18.

The inventive arrangement or device further includes two independently operable heating arrangements 12 and 13 comprising electrical resistive heating coils that are respectively arranged to spiral individually around the two legs or strands of the loop of the thread 11, and are individually connected to respective contacts of an electrical connector 17 such as a plug or socket connector for connection to an electrical power source through a switch or controller.

As mentioned above, in the initial installed condition, the mounting and adjusting bolt 18 is adjusted to exert and maintain the proper required pre-tension on the thread 11 for tightly holding the two components or structures together via the slide blocks 14 and 15 interconnected by the thread 11. In this regard, the bolt 18 holds the slide block 14, and a protrusion or shoulder of the housing 10 holds the slide block 15, to prevent the two slide blocks 14 and 15 from moving closer together, i.e. in order to maintain the specified spacing between the two slide blocks 14 and 15. Another retaining shoulder of the housing can similarly retain or stop the slide block 14. The housing 10 thereby forms a compression bracing structure that bears compressive forces between the two components, while the securing element 11 bears tensile forces between the two components. With the tensioned thread 11, the arrangement is tight and secure and exhibits no play. Thus, even with an oscillating loading applied to the arrangement by the components or structures being connected thereby, no gap will arise between the component that is to be separated and the arrangement itself.

Also, the above described arrangement with the housing 10 ensures that the slide blocks 14 and 15 will not come too close together and thereby damage or destroy the heating arrangements 12 and 13 during the installation and assembly of the arrangement. Therefore no special precautions and no special care are required during storage, handling and installation of the arrangement.

When it is intended to release and separate the two structures or components from each other, the inventive apparatus or device is electrically triggered by applying a suitable electrical voltage or current via the connector 17 to a first one of the heating arrangements 12. This causes the heating arrangement 12 to heat the thread 11, which further causes thread 11 to melt through. As an example, a thread made of the abovementioned "SPECTRA"™ high modulus polyethylene material and having a thread diameter of 0.1 mm can be melted through and thereby separated in a time of less than 1 second by the typical application of about 10 watts of power to the heating arrangement 12. Due to the separation of the first strand of the thread 11 by the heating arrangement 12, the thread loop will be broken open and thereby the second slide block 15 together with the structure or component mounted thereto will be released and separated from the first structure or component as the slide block 15 slides out of the housing 10. During that process, the remaining free thread 11 slips through the eyelet 15A and remains adhesively fixed (due to the glue in the eyelet 14A) to the first slide block 14 connected to the housing 10. Thus, no fragments, particles or other scraps of the thread 11 or any other components are released during the separation of the arrangement. This is an important advantage in applications in space in view of international regulations preventing the release of waste materials and in view of potential dangers that could be posed by the release of fragments if the device is arranged within a manned spacecraft.

If the first heating arrangement 12 fails or malfunctions for any reason, then the second heating arrangement 13 can be electrically activated in a similar manner as described above, whereby analogous processes would occur with respect to the second leg or strand of the loop of thread 11. Namely, the second heating arrangement 13 would heat and thereby melt through the second leg or strand of the loop of thread 11 to release the second slide block 15. As a further alternative, both heating arrangements 12 and 13 can be activated simultaneously to achieve a very rapid and very reliable redundant separation. In this case, however, it is possible that a small piece of the thread 11 will be separated and freely released from the device if both heating arrangements simultaneously melt trough the respective legs of the thread.

All of the materials, configurations and dimensions of the several parts of the apparatus or device are selected appropriately depending on the maximum load to be carried by the device. For example, the maximum load considerations will determine the appropriate size of the threaded holes to be provided in the slide blocks 14 and 15, the material, configuration and dimensions of the thread 11 forming the securing element and the overall size of the device. Due to the high tensile breaking strength of the fiber materials preferably used for the thread, the diameter of the thread 11 has only a minimal or subsidiary significance as to the structural size of the overall device. For example, the above mentioned "SPECTRA"™ high modulus polyethylene fibers have a breaking strength $\sigma$ of approximately 2700 MPa. As a concrete example, the inventive device using a M4 threaded connection and a thread made of the "SPECTRA"™ material and having a diameter of 0.1 mm can withstand a maximum load of up to about 2000 N, and the housing 10 may have overall dimensions of about 60 mm by 30 mm by 40 mm.

When the thread 11 is made of the "SPECTRA"™ material, then the heating arrangements 12 and 13 will achieve a clean melting separation of the thread without causing a chemical change of the thread material, so that neither gases nor contaminant particles are released. Since the apparatus does not use and expressly excludes explosive materials and pyrotechnic arrangements, and no burnable materials are exposed or released, the apparatus can therefore also be installed in an area accessible to astronauts, e.g. within occupied areas of a manned spacecraft.

On the other hand, if the thread is made of a polyparaphenyleneterephthalamide such as the abovementioned "KEVLAR"™ material, then the heating arrangements 12 and 13 will not melt through the thread, but rather the heat causes a thermal degradation or decomposition of the material which thereby no longer has the necessary tensile strength to hold together the two components. For this purpose, higher temperatures and thus also a higher heating power are required. In this regard, the effectiveness of the heating arrangements can be assisted or supported by the application of an oxidizing agent 11A or oxidation promoter onto the thread 11. When heat is applied, the oxidizing agent 11A will accelerate the thermal decomposition of the thread material. Such an embodiment using "KEVLAR"™ material is able to withstand higher operating temperatures, but has the disadvantage that a small amount of oxidation byproducts, for example $CO_2$, can be released during the activation of the heating arrangements.

Although the illustrated embodiments used a closed loop configuration of the thread forming the securing element, it is alternatively possible to form the securing element with a single linear leg or strand of thread extending between the two components, for example knotted or otherwise secured at its two opposite ends respectively to the two opposite components that are to be selectively held together or separated.

Instead of the above described electrical resistance spiral heating coil, the heating arrangement can comprise a linear blade-type electrical resistance heating element (e.g. a blade that is heated by electrical resistance) that is arranged proximate to or in contact with the thread. As further alternatives, the heating arrangement can comprise any other type of heating device that is controllably or selectively activatable to apply a sufficient heat to the securing element for thermally decomposing or melting the same. The heating device simply needs to be arranged sufficiently "proximate" to the securing element so as to be able to apply the required heat thereto.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An arrangement releasably securing components to one another comprising:
    a first component;
    a second component;
    a securing element that mechanically connects said first and second components to one another and that is separable by application of heat thereto, wherein said securing element comprises a thread configured as a continuous endless closed loop of a continuous endless thread material forming said thread, wherein said closed loop includes two straight thread strands that extend respectively along two straight lines between said first and second components and exert a tension force along said two straight thread strands between said first and second components; and
    at least one heating device comprising at least one electric resistance heating coil that spirals around at least one of said two straight thread strands of said securing element so as to generate and externally apply heat to said securing element and thereby separate said securing element to release said components from one another.

2. The arrangement according to claim 1, wherein said at least one electric resistance heating coil comprises two electric resistance heating coils that respectively individually spiral around said two thread strands of said securing element.

3. The arrangement according to claim 1, wherein said securing element is a non-explosive device.

4. The arrangement according to claim 1, wherein all parts of said arrangement other than said components are first and second and remain attached respectively to at least one or the other of said components at all times so that no fragments of said securing element or other parts of said arrangement are released from said components when said securing element is separated by the application of the heat thereto.

5. The arrangement according to claim 1, wherein said securing element is a tensile securing element that is able to support only tensile forces and not compressive forces between said first and second components.

6. The arrangement according to claim 1, wherein said securing element consists of said thread.

7. The arrangement according to claim 1, wherein said thread is a monofilament thread.

8. The arrangement according to claim 1, wherein said thread is a multifilament thread or a multifiber thread.

9. The arrangement according to claim 1, wherein said thread consists of a naturally occurring material.

10. The arrangement according to claim 1, wherein said thread consists of a synthetic material.

11. The arrangement according to claim 1, wherein said thread consists of a high-strength synthetic polymer.

12. The arrangement according to claim 1, wherein said thread consists of a high-modulus polyethylene.

13. The arrangement according to claim 1, wherein said thread is separable by melting due to the application of the heat thereto.

14. The arrangement according to claim 1, wherein said thread is separable by thermal decomposition due to the application of the heat thereto.

15. The arrangement according to claim 14, wherein said thread consists of a polymer, and said arrangement further comprising an oxidizing agent that is applied to said thread and that assists separating said thread through the thermal decomposition due to the application of the heat thereto.

16. The arrangement according to claim 1, further comprising an adhesive that adhesively fixes said thread to at least one of said first and second components.

17. The arrangement according to claim 1, further comprising a compression bracing structure that bears against and extends between said first and second components so as to bear compression forces between said first and second components.

18. The arrangement according to claim 17, wherein said securing element is installed with a pre-tension between said first and second components, said pre-tension is countered by said compression bracing structure, and said securing element is adjustably connected to at least one of said components so that said pre-tension is adjustable and settable.

19. The arrangement according to claim 1, wherein said thread consists of a polymer material.

20. An arrangement releasably securing components to one another comprising:
    a first component;
    a second component;
    a securing thread of a polymer material that mechanically connects said first and second components so as to bear tension forces therebetween, and that is separable by melting or thermal decomposition by application of heat thereto, wherein said securing thread is configured as a continuous endless closed loop of a continuous endless thread material forming said securing thread;
    an electric resistance heater arranged proximate to said securing thread so as to generate and apply the heat to said securing thread and thereby separate said securing thread; and
    a compression bracing structure that bears against and extends between said first and second components so as to bear compression forces between said first and second components.

21. The arrangement according to claim 20, wherein said closed loop of said securing thread includes two straight thread strands that extend respectively along two straight lines between said first and second components and exert said tension forces along said two straight thread strands between said first and second components, and wherein said electric resistance heater comprises two electric resistance heater coils arranged respectively with a respective one of said thread strands extending through each one of said heater coils.

* * * * *

UNITED STATES PATENT AND TRADEMARK OFFICE
CERTIFICATE OF CORRECTION

PATENT NO. : 7,396,182 B2
APPLICATION NO. : 11/174436
DATED : July 8, 2008
INVENTOR(S) : Retat et al.

Page 1 of 1

It is certified that error appears in the above-identified patent and that said Letters Patent is hereby corrected as shown below:

<u>Column 7</u>,
Line 53, after "other than said", insert --first and second--;
and after "components are", delete --first and second--.

Signed and Sealed this

Thirteenth Day of October, 2009

David J. Kappos
*Director of the United States Patent and Trademark Office*